US011066825B2

(12) United States Patent
Kleisinger et al.

(10) Patent No.: US 11,066,825 B2
(45) Date of Patent: Jul. 20, 2021

(54) QUONSET BUILDING WITH INTERNAL TOWER SUPPORT

(71) Applicant: Meridian Manufacturing, Inc., Winnipeg (CA)

(72) Inventors: Chad Kleisinger, Regina (CA); Andrew Froese, Winkler (CA); Andreas Riffel, Carroll (CA)

(73) Assignee: Meridian Manufacturing, Inc., Winnipeg (CA)

( * ) Notice: Subject to any disclaimer, the term of this patent is extended or adjusted under 35 U.S.C. 154(b) by 363 days.

(21) Appl. No.: 15/841,753

(22) Filed: Dec. 14, 2017

(65) Prior Publication Data

US 2018/0187408 A1    Jul. 5, 2018

Related U.S. Application Data

(60) Provisional application No. 62/440,120, filed on Dec. 29, 2016.

(51) Int. Cl.
| E04B 1/34 | (2006.01) |
| E04B 1/342 | (2006.01) |
| E04B 1/32 | (2006.01) |
| E04B 1/24 | (2006.01) |
| A01K 1/00 | (2006.01) |
| E04H 5/08 | (2006.01) |
| E04H 6/08 | (2006.01) |

(52) U.S. Cl.
CPC .......... E04B 1/3404 (2013.01); E04B 1/3205 (2013.01); E04B 1/342 (2013.01); *A01K 1/00* (2013.01); *E04B 1/2403* (2013.01); *E04B 2001/2415* (2013.01); *E04B 2001/3241* (2013.01); *E04H 5/08* (2013.01); *E04H 6/08* (2013.01)

(58) Field of Classification Search
CPC ...... E04B 1/3404; E04B 1/3205; E04B 1/342; E04B 2001/3241
USPC .................................................. 403/346, 400
See application file for complete search history.

(56) References Cited

U.S. PATENT DOCUMENTS

| 1,959,653 | A | * | 5/1934 | Barzaghi ............... | E04B 1/3205 52/308 |
| 2,520,555 | A | * | 8/1950 | Major ..................... | A01K 1/10 119/449 |
| 2,611,160 | A | * | 9/1952 | Hanesse ............... | A63H 33/107 182/228.1 |
| 2,641,988 | A | * | 6/1953 | Perkins ..................... | E04H 5/08 34/233 |
| 2,666,507 | A | * | 1/1954 | Ruark ................... | E04B 1/3205 52/639 |

(Continued)

FOREIGN PATENT DOCUMENTS

WO     9849403 A3    11/1998

*Primary Examiner* — Joshua K Ihezie
(74) *Attorney, Agent, or Firm* — McKee, Voorhees & Sease, PLC (57) ABSTRACT

A quonset style building is provided with an arched-roof defining a width, length and height, and tower supporting the roof adjacent its apex. The tower separates storage areas on opposite sides of the building. The tower also permits the building height and width to be increased over conventional quonset buildings, and allows the width to be 3× the height, while withstanding typical weather forces, including wind and snow.

10 Claims, 8 Drawing Sheets

(56) References Cited

U.S. PATENT DOCUMENTS

| | | | | |
|---|---|---|---|---|
| 2,801,716 | A * | 8/1957 | Colby, Jr. | E04B 1/3205 52/274 |
| 3,057,119 | A * | 10/1962 | Kessler | E04B 1/3205 29/449 |
| 3,256,030 | A * | 6/1966 | Banse | E04B 1/2608 248/300 |
| 3,279,132 | A * | 10/1966 | Slayter | E04B 1/0007 52/238.1 |
| 3,300,923 | A * | 1/1967 | Behlen | E04B 1/3205 52/245 |
| 3,690,078 | A * | 9/1972 | Maynard, Jr. | E04B 1/1903 135/137 |
| 3,748,796 | A * | 7/1973 | Ouellet | E04B 1/3205 52/600 |
| 3,930,344 | A * | 1/1976 | Gahler | A01G 9/1415 52/2.17 |
| 3,940,105 | A * | 2/1976 | Metrailer | E04G 11/062 249/18 |
| 3,974,602 | A * | 8/1976 | Pohl | E04B 1/34315 52/143 |
| 4,109,395 | A * | 8/1978 | Huang | A01G 9/246 34/93 |
| 4,177,613 | A * | 12/1979 | Czeiner | E04B 7/08 52/86 |
| 4,244,146 | A * | 1/1981 | Kranz | A01G 9/14 47/17 |
| 4,336,674 | A * | 6/1982 | Weber | E04H 9/12 52/11 |
| 4,573,294 | A * | 3/1986 | Lienhard | E04B 1/24 52/93.2 |
| 4,602,461 | A * | 7/1986 | Cummins | E04C 3/16 52/404.3 |
| 4,782,686 | A * | 11/1988 | Carson, Jr. | B21D 7/06 72/373 |
| 5,344,362 | A * | 9/1994 | Bagley | A01F 25/02 454/180 |
| 5,375,943 | A * | 12/1994 | McCavour | E01F 5/005 138/173 |
| 5,577,353 | A * | 11/1996 | Simpson | E04B 7/022 403/170 |
| 5,715,634 | A * | 2/1998 | Schultz | E04D 3/08 52/200 |
| 5,732,524 | A * | 3/1998 | Kalker, Jr. | E04B 1/2608 403/232.1 |
| 5,983,577 | A * | 11/1999 | Hays | E04B 1/24 52/640 |
| 6,151,858 | A | 11/2000 | Ruiz et al. | |
| 6,272,796 | B1 * | 8/2001 | Metzler | E04B 1/28 403/245 |
| 6,279,288 | B1 * | 8/2001 | Keil | E04B 1/5831 403/2 |
| 6,295,781 | B1 * | 10/2001 | Thompson | E04B 1/2608 403/232.1 |
| 6,993,880 | B2 * | 2/2006 | Cameron | E04B 7/063 52/653.2 |
| 7,475,517 | B2 * | 1/2009 | Kawai | E04B 7/024 52/262 |
| 7,647,737 | B2 | 1/2010 | Morello | |
| 7,739,841 | B1 * | 6/2010 | Puckett | E04B 1/24 52/639 |
| 8,176,689 | B1 * | 5/2012 | Thompson | E04B 1/2608 52/702 |
| 8,770,885 | B2 * | 7/2014 | Myers | F16B 2/12 403/374.3 |
| 9,127,451 | B1 * | 9/2015 | Boor | E04F 13/22 |
| 9,988,805 | B1 * | 6/2018 | Smith | E04C 3/04 |
| 2001/0042351 | A1 * | 11/2001 | Keil | E04B 1/5831 52/653.2 |
| 2006/0080905 | A1 * | 4/2006 | Morello | E04B 1/3205 52/86 |
| 2010/0005749 | A1 * | 1/2010 | Abdel-Sayed | E04B 1/24 52/650.2 |
| 2010/0058689 | A1 * | 3/2010 | Campbell | E02D 27/02 52/270 |
| 2012/0272607 | A1 * | 11/2012 | Cooper | E04B 1/24 52/655.1 |
| 2013/0042568 | A1 * | 2/2013 | Davis | E04B 1/24 52/634 |
| 2013/0098233 | A1 * | 4/2013 | Peters | F41H 5/24 89/36.02 |
| 2014/0075859 | A1 * | 3/2014 | Harkins | F24S 20/66 52/169.11 |
| 2015/0267407 | A1 * | 9/2015 | Sirowatka | E04C 3/16 52/690 |
| 2016/0262318 | A1 * | 9/2016 | Lloyd | A01G 9/16 |

* cited by examiner

QUONSET BUILDING WITH INTERNAL TOWER SUPPORT

CROSS-REFERENCE TO RELATED APPLICATIONS

This application claims priority to Provisional Application U.S. Ser. No. 62/440,120, filed on Dec. 29, 2016, which is herein incorporated by reference in its entirety.

BACKGROUND OF THE INVENTIONS

Quonset buildings having an arched or curved roof and wall structure are well known in many industries, including agriculture, industrial, commercial, and aviation. For example, in agriculture, quonset buildings are used for storage of equipment, grain, fertilizer, and harvested crops. These buildings provide simple construction, maximum space efficiency, easy access, and substantially maintenance free operation. One advantage of quonset buildings over steel or wooden frame buildings having internal support beams and columns is the wide open floor or storage space of the quonset building. Quonset buildings have two primary options for construction. First, the building can be self-supported by the arch shape, or secondly, it can be supported with trusses extending across the width of the arch and along the length of the building. Both options have limitations on the arch span.

The conventional quonset buildings obtain structural strength from the corrugated sheet metal skin that forms the arch shape roof and walls. However, corrugation machines generally limit the sheet metal plate thickness to 16 gauge material, which then limits the building span to a maximum of 68 feet, and a maximum peak height of 23 feet from floor to ceiling. Thicker material or deeper corrugations would allow wider spans, but existing machinery cannot economically manufacture such heavier duty metal sheets. Thus, wider span quonset buildings would require reinforcement to prevent structural collapse. Steel and wooden frame buildings often use an array of beams and column, but such supports are not conclusive to the free, open span of a quonset building and would make the quonset building cumbersome and/or impossible to use for the primary storage purposes. Some quonset construction includes interior walls, but such walls are not attached to the arch. Such walls have a rigid construction which is capable of withstanding side loads. Connecting beams to the corrugated sheet metal induces an area of stress concentration which can lead to structural failure of the corrugated material due to localized buckling.

Therefore, a primary objective of the present invention is the provision of a quonset building having internal bracing to allow greater spans without obstructing open storage spaces within the building.

Another objective of the present invention is the provision of a quonset building having longitudinally extending braces that support the corrugation in a manner to spread stress over a large area, and providing moment resistance.

A further objective of the present invention is the provision of a braced quonset building which permits one section of corrugated material to transfer stress over a vertical structural support to another section of corrugation material.

Still another objective of the present invention is the provision of a quonset style building having an internal, central support tower at approximately the center of the building, which allows the width and height of the building to be substantially increased compared to conventional quonset buildings.

Yet another objective of the present invention is the provision of a quonset building having a width at least 3× the height of the building.

A further objective of the present invention is the provision of a quonset style building having a central support tower with sides capable of withstanding lateral loads.

Another objective of the present invention is the provision of a quonset building with a central support tower extending along its length, wherein the tower provides additional mechanical features, including a air plenums for distributing air to storage areas within the building.

Still another objective of the present invention is the provision of a quonset building having a support tower which structurally supports the arch width, and which divides the building into separate storage areas on opposite sides of the tower.

A further objective of the present invention is the provision of a quonset building having maximum storage capacity, and having economical material and construction costs, and able the withstand normal forces and conditions of weather.

These and other objectives will become apparent from the following description of the invention.

SUMMARY OF INVENTION

The quonset style building of the present invention includes an arched roof with opposite sides and opposite ends, defining a width, a length, a height and a longitudinal axis. Each end of the building has walls, with one or more doors for entry and exit. The doors may be garage doors for moving vehicles and other large equipment in and out of the building, as well as doors for personnel entry and exit.

A support tower extends vertically from the floor to the roof along the longitudinal axis to support the curved roof. Braces extend on opposite sides of the tower to the roof. The tower forms storage areas on opposite sides of the tower. The tower may include air plenums to provide heat and/or air conditioning to the storage areas.

The quonset style building, with the internal support tower, can generally withstand all of the normal forces of nature, including wind and snow. The support tower permits the width and height of the building to be increased substantially over prior art quonset buildings and allows the width to be at least 3× the height of the building, while using 16 gauge corrugated sheet metal for the roof.

DETAILED DESCRIPTION OF THE INVENTION

The quonset building 10 of the present invention includes a perimeter foundation 12, an arched upper sheet 14 forming the roof and opposite sides of the building, and end walls 16 at each end of the arch. One or both of the end walls 16 can have doors 18 for entry and exit to and from the building 10.

The above described structure of the quonset building 10 is conventional.

The invention is directed toward an internal vertical support tower 20 and bracing assemblies 22 to provide structural support to the arch member 14, and thereby allow increased spans for the building 10. The vertical support can take various forms, such as the tower shown in the drawings, or a simplified single column, all of which provide moment resistance to unbalanced loads. The support tower 20 extends longitudinally along the center of the building 10, with bracing assemblies 22 extending between the support 20 and the arch roof 14 on opposite sides of the support 20.

Figure 1:
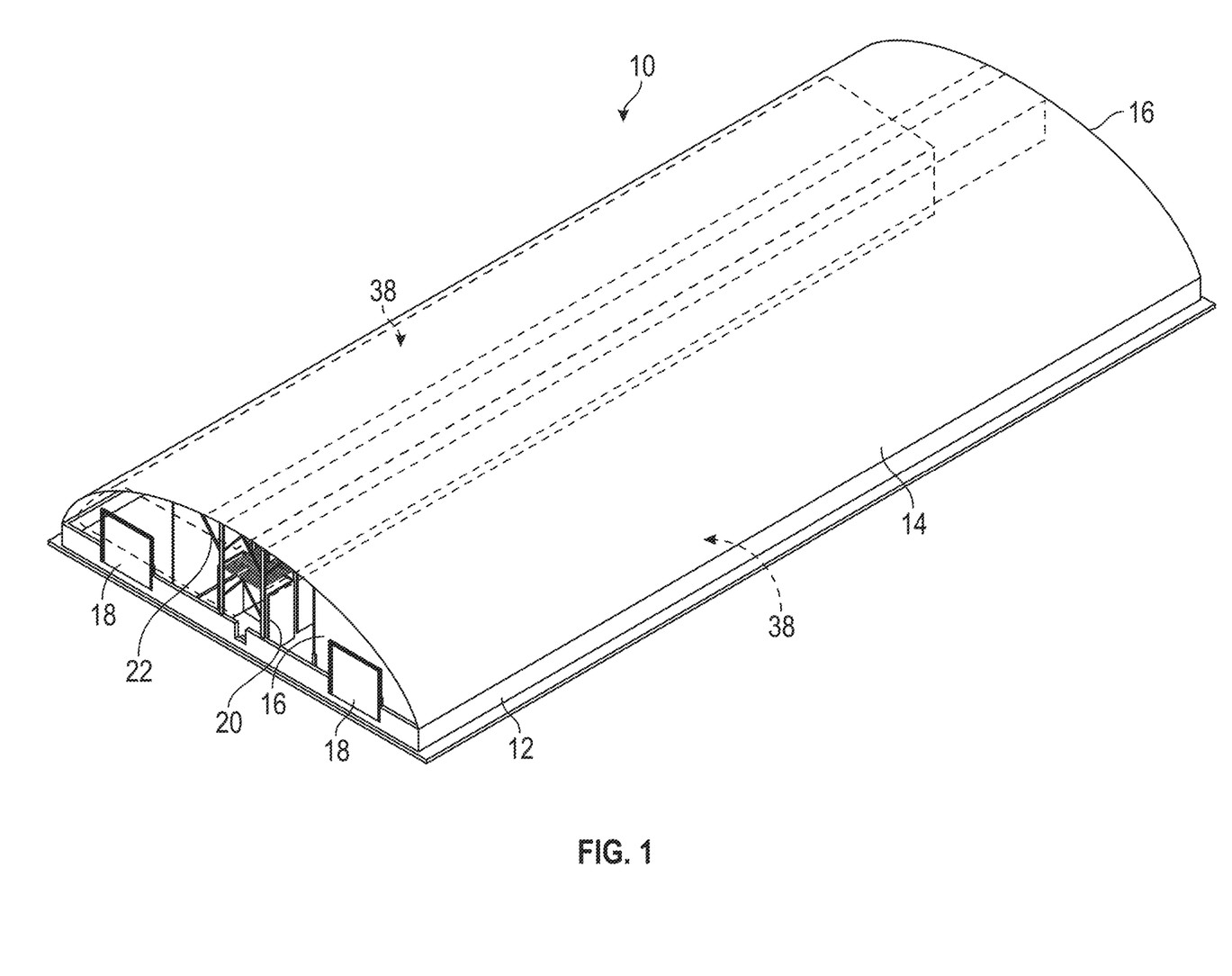
FIG. 1 is a perspective view of a quonset building according to the present invention.
Figure 2:
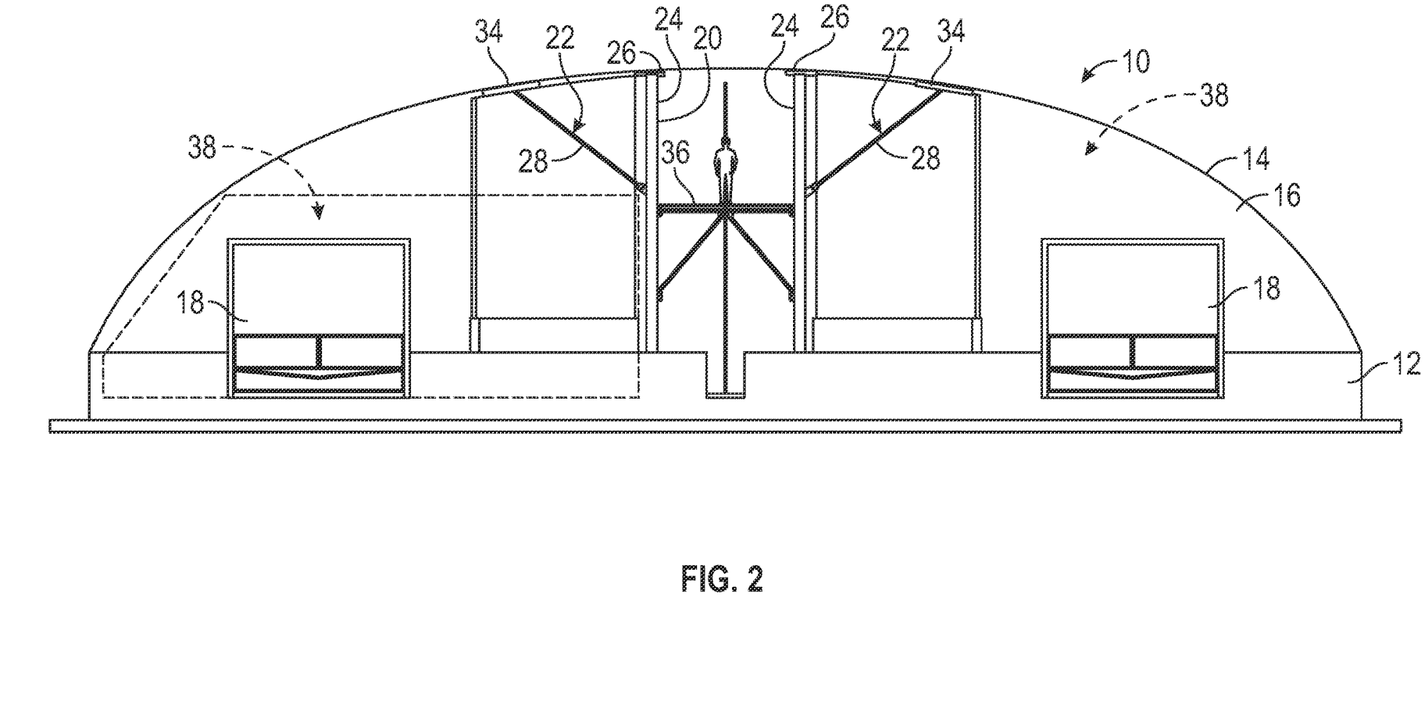
FIG. 2 is an end view of the quonset building according to the present invention.
Figure 3:
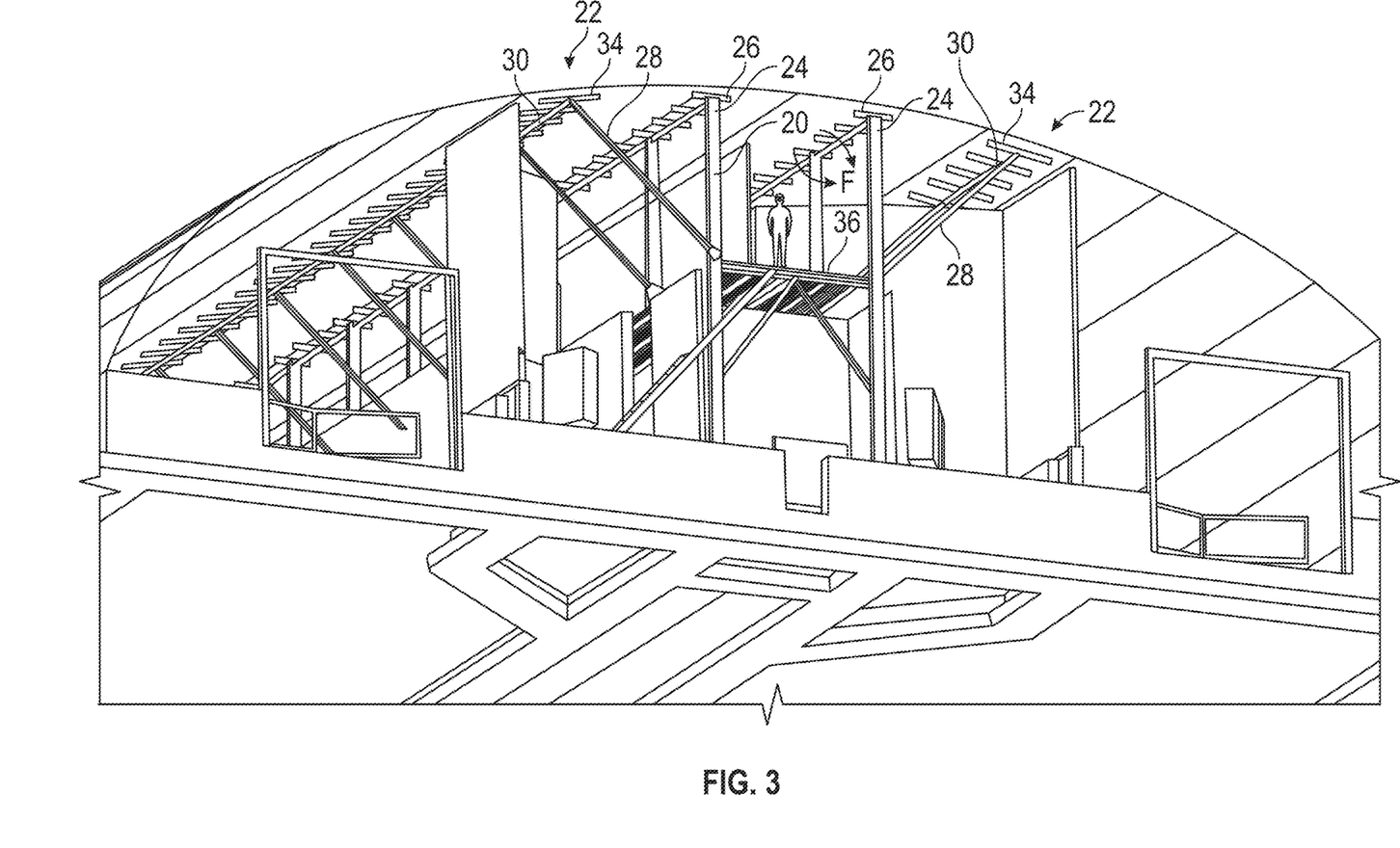
FIG. 3 is a perspective view showing the vertical support tower and braces for the quonset building, according to the present invention.
Figure 4:
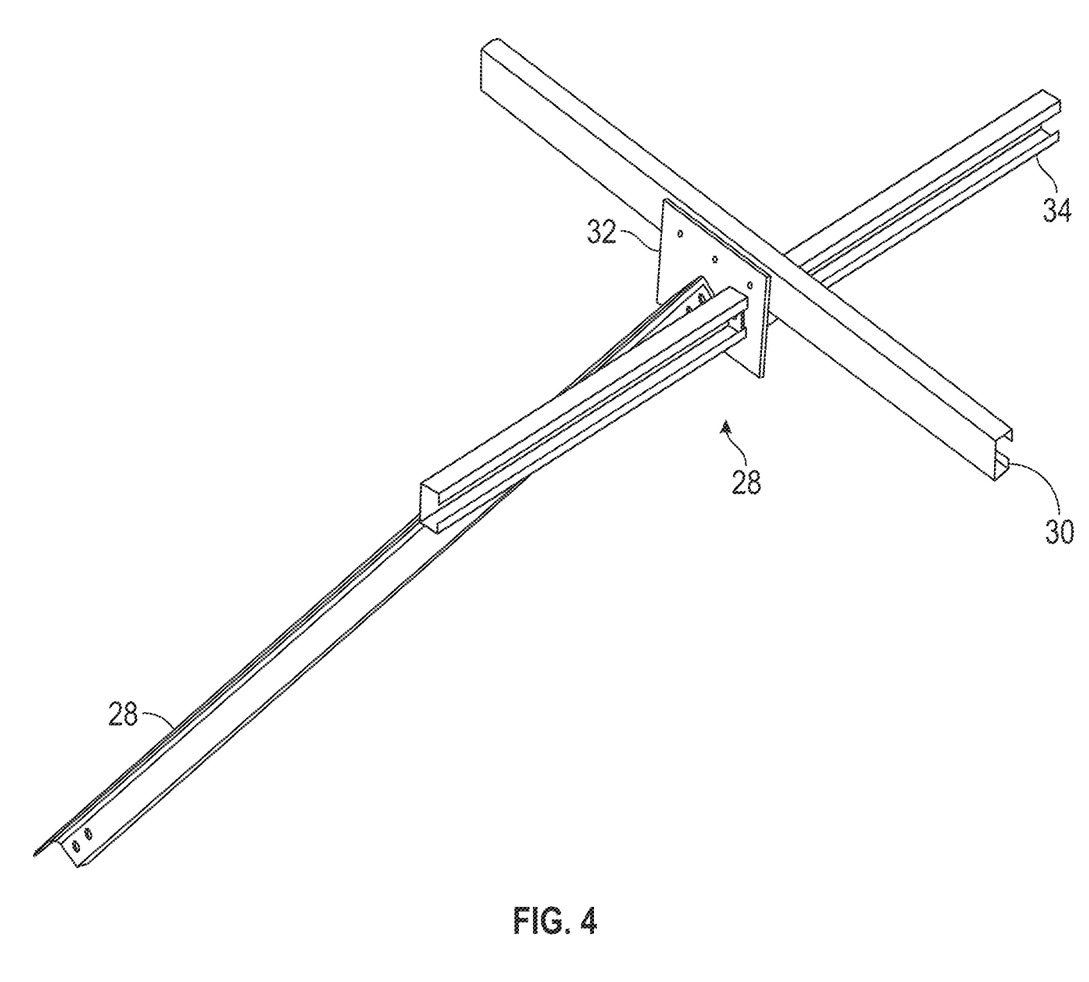
FIG. 4 is a perspective view of one of the brace assemblies.
Figure 5:
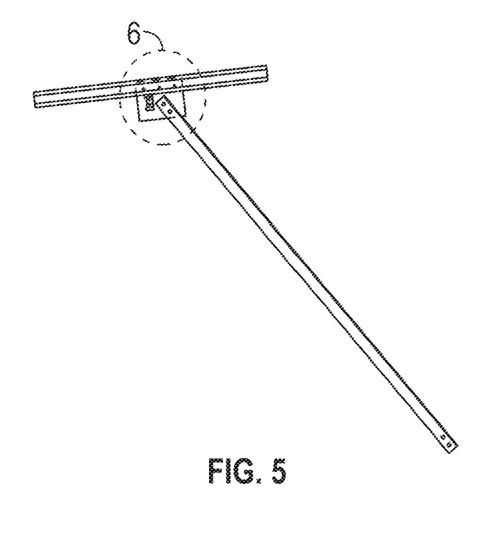
FIG. 5 is a side elevation view of a brace assembly.
Figures 6, 7, 9:
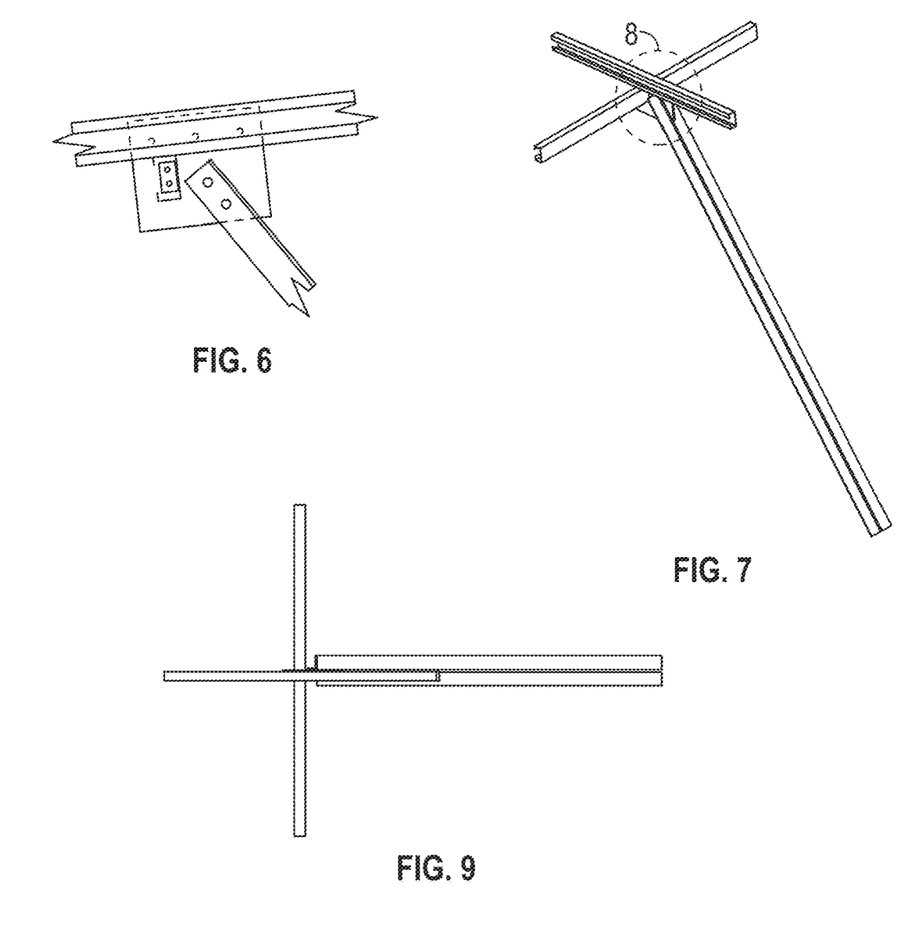
FIG. 6 is an enlarged view taken along line A of FIG. 5.
FIG. 7 is a perspective view showing the brace assembly components.
FIG. 9 is a bottom plane view of the brace assembly.
Figure 8:
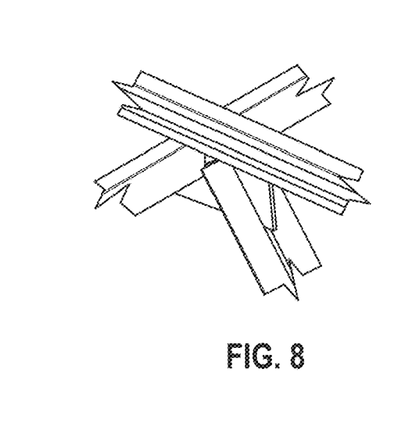
FIG. 8 is an enlarged view taken along line B of FIG. 7.
Figure 10:
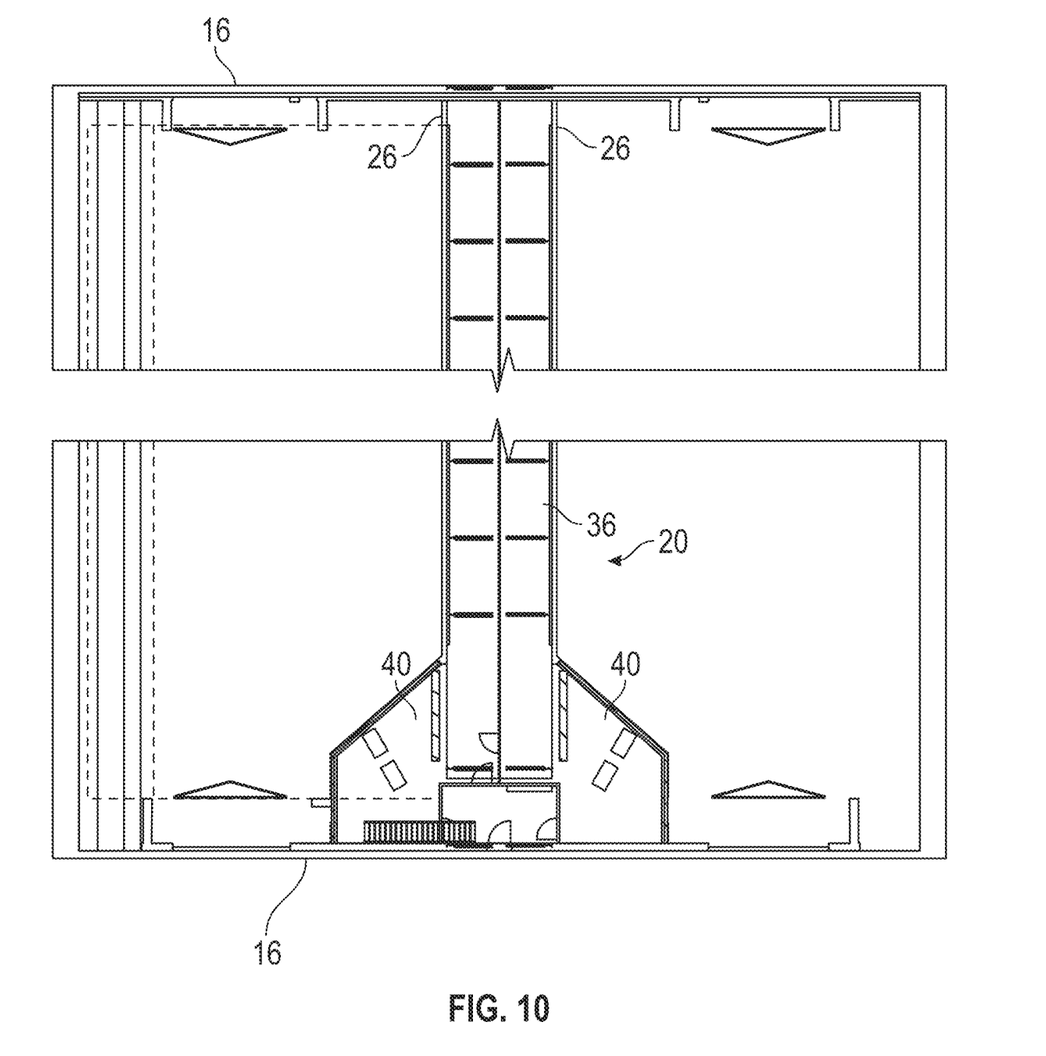
FIG. 10 is a sectional view taken along line B-B of FIG. 2.
Figure 11:
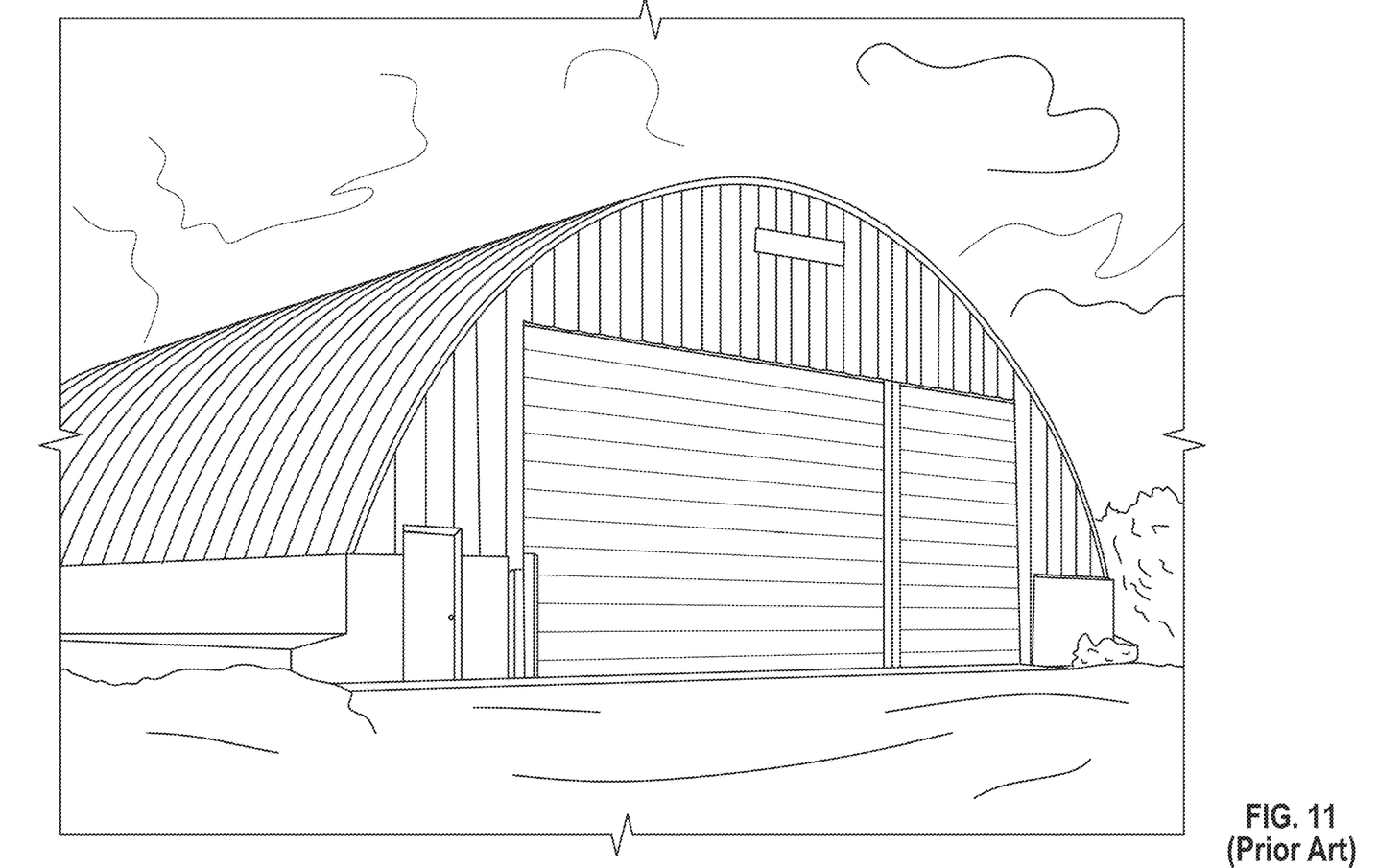
FIG. 11 shows the exterior of a conventional quonset building.
Figure 12:
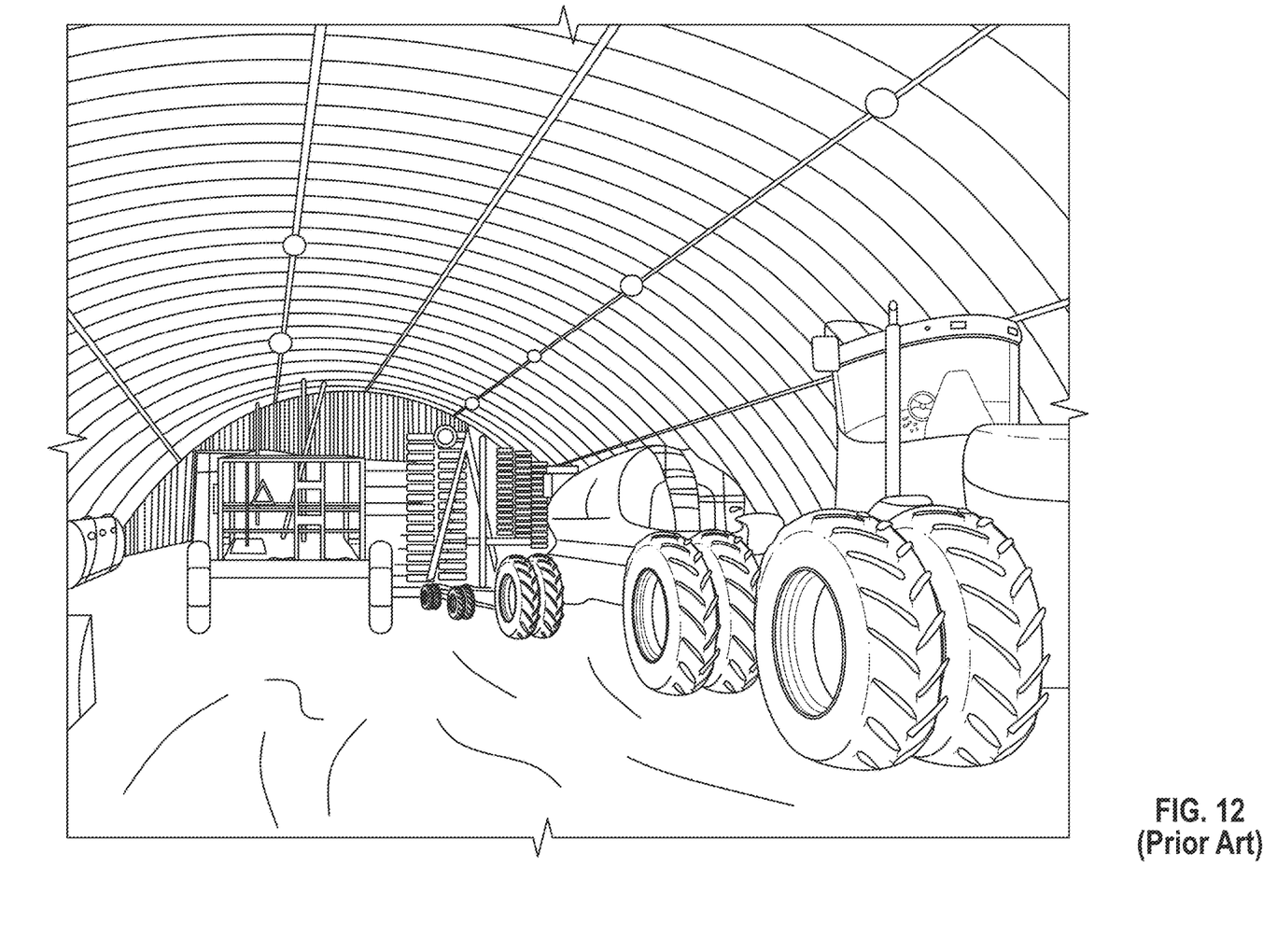
FIG. 12 shows the interior of a conventional quonset building.

More particularly, as seen in FIGS. 2 and 3, the support 20 extends from the floor of the building 10 to the arch 14. The tower 20 includes a plurality of vertical posts or girts 24 spaced apart on opposite sides of the center line or longitudinal axis of the building 10. Each girt 24 is secured at its lower end to the building floor and at its upper end to an inside seamline rafter 26.

A pair of outside seamline rafters 30 are fixed to the inside of the arch member 14 on each side of the center axis and extend longitudinally along the length of the building 10. Each bracing assembly 22 includes a knee brace 28, a rafter connection plate 32, and a pair of purlins 34. The rafter connection plate 32 is bolted or welded to the outside seamline rafter 30. The pair of purlins 34 are fixed to the plate 32 and extend in opposite directions, perpendicular to the outside seamline rafter 30. The upper end of the knee brace 28 is fixed to the connection plate 32 by bolts, clips, welding or any other convenient means. The lower end of the knee brace 28 is attached to the girt 24.

The tower 20 serves as a multifunctional feature of the building 10. The tower may include a platform or catwalk 36. Also, the tower 20 may have walls or ducts to define one or more air plenums or passages 35 within the tower to provide hot and/or cold air to the storage areas 38 on either side of the tower. The walls of the tower can withstand loading from product storage, such as pallets of material or harvested crops. The knee braces 28 provide structural supports for balanced and unbalanced loads on the exterior of the building, such as snow and wind.

A fan house 40 may also be provided on one or both sides of the tower 20. The tower also divides the storage areas 38 on each side of the building 10, such that each storage environment can be independently controlled. For example, the temperature and/or humidity in each storage are 38 can be different from one another. One or more control rooms can be provided in or adjacent the tower 20 to control the atmosphere in the storage areas 38. The air plenums and controls allows the air flow and static pressure in each storage 38 to be set at desired levels, and changed or adjusted to accommodate air ventilation requirements.

In the preferred construction, the tower 20 is erected first, and then the arch member 14 is constructed over the tower 28. The tower 20 and the arch member 14 are structurally interconnected, such that the tower 20 is integral to the stability of the arch 14.

With the tower and bracing assembly of the present invention, the quonset building 10 can have wider spans and carry balanced and unbalanced loads, compared to conventional quonset buildings without the tower and bracing. A building width more than three times the building height can be achieved with the braced arch according to the present invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A quonset style building, comprising:
an arched structure forming a curved roof with a central apex, opposite lateral sides, and having opposite ends defining a longitudinal axis;
a first pair of rafters extending longitudinally on opposite sides of the apex;
a second pair of rafters extending longitudinally and spaced laterally outwardly from the first pair of rafters;
end walls at each end of the arched structure;
a vertical support tower extending longitudinally and centrally within the arched structure, and having girts extending upwardly from the floor and being connected to the first pair of rafters on opposite sides of the apex;
braces extending upwardly and outwardly between the girts and the second pair of rafters, wherein each of the braces includes a purlin and a knee brace; and
storage areas on each side of the tower.

2. The quonset style building of claim 1 further comprising a plate to interconnect the purlin and the knee brace.

3. The quonset style building of claim 1 wherein the vertical support includes an air plenum.

4. The quonset style building of claim 1 wherein the tower includes a catwalk.

5. The quonset style building of claim 1 wherein the roof is 16-gauge corrugated sheet metal.

6. The quonset style building of claim 1 wherein the roof has a width greater than 68 feet.

7. The quonset style building of claim 1 wherein the roof has a height greater than 23 feet.

8. The quonset style building of claim 1 further comprising a pair of doors on one end wall on opposite lateral sides of the tower to provide ingress and egress to the storage areas.

9. The quonset style building of claim 1 further comprising a control system to regulate air in the storage areas.

10. The quonset style building of claim 9 wherein the control system regulates air in the storage areas independently of one another.

* * * * *